United States Patent [19]
Wyse et al.

[11] Patent Number: 5,473,946
[45] Date of Patent: Dec. 12, 1995

[54] ACCELEROMETER USING PULSE-ON-DEMAND CONTROL

[75] Inventors: Stanley F. Wyse, Encino; Daniel P. McLane, Bell Canyon; Jason A. Herring, Burbank, all of Calif.

[73] Assignee: Litton Systems, Inc., Beverly Hills, Calif.

[21] Appl. No.: 304,090

[22] Filed: Sep. 9, 1994

[51] Int. Cl.⁶ ............................................... G01P 15/13
[52] U.S. Cl. .................................. 73/514.18; 73/514.21
[58] Field of Search ........................... 73/517 B, 517 R, 73/862.61

[56] References Cited

U.S. PATENT DOCUMENTS

| | | | |
|---|---|---|---|
| 4,094,199 | 6/1978 | Holdren et al. | 73/517 B |
| 4,282,470 | 8/1981 | Reynolds | 318/648 |
| 4,483,194 | 11/1984 | Rudolf | 73/517 R |
| 4,584,885 | 4/1986 | Cadwell | 73/862.61 |
| 4,679,434 | 7/1987 | Stewart | 73/517 B |
| 4,736,629 | 4/1988 | Cole | 73/517 R |
| 4,841,773 | 6/1989 | Stewart | 73/510 |
| 4,932,261 | 6/1990 | Henrion | 73/517 B |
| 4,987,779 | 1/1991 | McBrien | 73/517 B |
| 5,142,921 | 9/1992 | Stewart et al. | 73/866.1 |
| 5,277,053 | 1/1994 | McLane et al. | 73/10 |

Primary Examiner—John E. Chapman
Attorney, Agent, or Firm—Klein & Szekeres

[57] ABSTRACT

A force balanced accelerometer system comprises an accelerometric sensor and a control system. The sensor comprises a conductive pendulum pivotably mounted between first and second electrode plates. The control system establishes a cycle period with three phases. In the first phase, the pendulum is electrically isolated in an electric field established between the electrodes. The pendulum is moved from a null position in response to inertial acceleration, and a pickoff signal indicative of the acceleration-responsive position is generated. The pickoff signal is fed into a sample-and-hold circuit and then into a servo compensation circuit, having proportional and integral control, so as to generate a force-indicative signal indicative of the magnitude and direction of the force required to restore the pendulum to the null position. At the start of the second phase, the electrode required to restore the pendulum to its null position, selected in accordance with the sign of the force-indicative signal, is maintained at a first fixed potential, while the pendulum and the other plate are switched to a second fixed potential. The second phase is maintained for a time period determined by the magnitude of the force-indicative signal, which time period is a measure of the sensed acceleration. At the end of the second phase, the third phase begins with the electrodes and pendulum switched to ground, until the cycle repeats. The cycle period and the timing of the phases are controlled by a microprocessor.

20 Claims, 4 Drawing Sheets

POSITIVE ACCELERATION INPUTS

NEGATIVE ACCELERATION INPUTS

ACCELEROMETER USING PULSE-ON-DEMAND CONTROL

BACKGROUND OF THE INVENTION

This invention relates generally to the field of closed loop, force balanced, inertial accelerometers. More specifically, it relates to a solid state (i.e., silicon), electrostatically-rebalanced accelerometer having electrostatic position pick-off of the sensing mass, and pulse-on-demand servo control.

Force balance sensing instruments, such as inertial accelerometers, often use a sensing member ("sensing mass" or "proof mass") that is movable from a nominal position in response to an input condition (e.g., inertial acceleration) that is to be sensed. A position pickoff provides a signal that is indicative of sensing member position, while a feedback signal, based on the pickoff signal, applies a force to the sensing member that tends to return it to the nominal position. The feedback signal may also provide an instrument output signal representing the sensed input condition. It is generally desired that the instrument output signal be proportional to the input condition. Thus, in many types of electrostatic and electromagnetic force balance sensing instruments, in which the forces applied to restore the sensing member to its nominal position are not linearly related to the feedback voltage or current supplied to the forcing means, special techniques are employed to obtain a linear relationship between the instrument output and the sensed input. Such linearization techniques are also dictated by the need to optimize the operation of the instrument itself by providing a feedback force applied by the feedback control network that has a linear relationship to the sensed input.

For example, in an electrostatic force balanced accelerometer, of the type disclosed in U.S. Pat. No. 4,679,434 to Stewart, electrostatic forcing in a closed loop system is employed to position and obtain an output signal from a pendulous inertial sensing mass. The electrostatic forcing system employs a capacitive pickoff electrode on each side of the sensing mass. The electrodes also apply nominally equal and opposite bias forces to the sensing mass, to which is applied a control voltage. In another control arrangement for an accelerometer of this type, a fixed bias voltage V is applied to the sensing mass, and feedback voltages +v and −v are applied concurrently to pickoff and forcing electrodes on opposite sides of the mass. Accordingly (omitting factors such as gap variation, parallelism, dielectric constants and the like, which may also affect the electrostatic forces), the force applied by each electrode to the sensing mass is proportional to $(V+v)^2$ and $(V-v)^2$, respectively. The net force applied to the mass by this control system is therefore the difference between these two forces, which is effectively proportional to 4 vV. As the bias voltage V is a constant, the feedback voltage, of magnitude v, is proportional to the feedback force applied, and it is also linearly related to the input acceleration experienced by the sensing mass.

The above-described system has a number of problems, including the large negative spring effect associated with the required bias electric fields. Even in the absence of any input acceleration to be sensed, the bias fields are required, and, since both the bias fields and the pickoff null position may vary, the instrument may have poor null stability and repeatability. In addition, such factors as gap variation, component aging, temperature variations, and the like, may provide sources of error that can result in spurious outputs and decreased null stability. Furthermore, small variations in electric field strength are exacerbated by the negative spring effect in voltage biased systems, caused by the two large bias fields, which effect may be unacceptably large for typical ranges of accelerometer inputs.

U.S. Pat. No. 5,142,921 to Stewart et al. discloses a force balanced instrument system in which the position of the sensing mass is capacitively sensed, and the mass is electrostatically forced toward a null position. A pickoff signal indicative of the positional displacement of the sensing mass is generated. Constant magnitude attractive forces are alternately applied to opposite sides of the sensing mass, with the duration of force application depending upon the position of the sensing mass and the resultant pickoff signal value. While this system addresses the linearity demands described above, its performance depends upon the application of equal charges to capacitive plates on either side of the sensing mass, which is sometimes difficult to achieve in practice. Moreover, because the system generates its pickoff signal by sensing voltages associated with the capacitive forcing charges, the sensing mass is subject to forces during the pickoff phase, which may be a source of error.

U.S. Pat. No. 5,277,053 to McLane et al. discloses an electrostatic, force balanced accelerometer system, in which a pickoff signal, indicative of the positional displacement of a sensing mass from a null position in response to inertial acceleration, is used to calculate a restoring force. A feedback signal, proportional to the square root of the restoring force, is applied to an electrostatic square law forcing circuit that applies an electrostatic restoring force to one side or the other of the sensing mass, by means of electrodes between which the sensing mass is pivotably mounted. A system output signal is proportional to the calculated restoring force, and thus is linearly proportional to the sensed acceleration. The transfer function of the forcing circuit is empirically determined by applying a series of known accelerations and measuring the balancing signal required to restore the sensing mass to its null position. The feedback signal is then generated, having a relationship to the pickoff signal that is the inverse of the empirically determined transfer function of the forcing circuit. A disadvantage of this system stems from its excitation of the electrodes by an AC signal to provide a high frequency pickoff signal that represents the sensing mass position. This results in a force being applied to the sensing mass during the position detection period, with possible resultant errors. In addition, the electronic circuitry required by this system is relatively complex and costly.

There has thus been a long-felt, but as yet unsatisfied need for a force balanced sensing system, particularly an accelerometer system, that eliminates or at least minimizes the shortcomings of the prior art. Specifically, such a system should minimize or eliminate such sources of error as negative spring effects and forces on the sensing mass during the position detection period. Such a system should also optimize null stability and repeatability, while minimizing spurious output signals. Finally, such a system should reduce the number, complexity, and costs of the components required to produce it, as compared with prior art systems.

SUMMARY OF THE INVENTION

A closed loop, force balanced accelerometer system, in accordance with the present invention, comprises an accelerometric sensor and a control system for the accelerometric sensor. The accelerometric sensor, in turn, comprises a conductive sensing mass, pivotably supported by a pair of hinges as a pendulum in a narrow gap between first and second fixed electrode plates. During the position detection ("pickoff") period, the accelerometric sensor operates much as a capacitive bridge, in that, when fixed voltages are applied to the electrode plates, the conductive sensing mass or pendulum forms a pair of capacitors, one with each of the electrode plates.

The control system for the accelerometric sensor is a closed loop servo system that senses the pendulum's acceleration-induced displacement with respect to a null position in the gap, and generates a position-indicative pickoff signal. The pickoff signal, in turn, generates a signal indicative of the force required to restore the pendulum to its null position. The force-indicative signal is applied to the appropriate electrode to create an electrostatic force that forces the pendulum back to its null position. The time over which the restorative force is applied is proportional to the sensed acceleration input, so this measured time of force application may be used to generate an acceleration-indicative instrument output signal.

More specifically, the control system operates in three phases. In the first, or pickoff, phase, a fixed positive voltage is applied to the first electrode plate, and a fixed negative voltage of equal magnitude is applied to the second electrode plate. Thus, a voltage gradient is established by the electric field generated in the gap and across the pendulum. The pendulum is electrically isolated in the field by being connected to a high impedance, so that the pendulum assumes a voltage that is proportional to its position in the electric field. This voltage is thus reflected as a position-indicative pickoff output signal. During this pickoff phase, no net electrostatic force is ideally applied to the pendulum, since the pendulum acts as an open-circuited probe measuring the potential of the electric field between the electrode plates. The lack of a net electrostatic force on the pendulum minimizes pickoff-induced error sources.

The pickoff output signal is then sampled and filtered to generate a force-indicative signal that indicates the magnitude and direction of the force required to restore the pendulum to its null position.

At this point in the cycle, the second, or torquing, phase begins. The pendulum is switched to a constant voltage (preferably, zero potential or ground), while the electrode plate required to restore the pendulum to its null position is maintained at its fixed voltage. The other electrode plate is switched to the same voltage (i.e., ground) as the pendulum. This condition is maintained for the period of time indicated by the force-indicative signal, and this time period thus determines the average force applied to the pendulum. Because the pendulum mass is a known constant, this time period is therefore a measure of the sensed acceleration. If no torquing is required (the pickoff output signal indicating that there has been no displacement from the null position), the torquing phase may ideally be skipped, with no restorative force applied to the pendulum. (Practical considerations may dictate that a minimum-duration torquing phase be employed in zero acceleration conditions, especially if it is desired to simplify bias compensation.)

After the torquing phase time period has expired, the third, or quiescent phase begins, during which no electrostatic forces are applied to the pendulum. Both electrode plates are switched to the pendulum voltage (ground). This quiescent, no force phase continues to the end of the cycle. The cycle is then repeated (beginning again with the pickoff phase) at a rate sufficient to achieve the bandwidth and resolution required by the particular application.

The primary advantages of the present invention are the low servo-induced errors, simplicity of mechanization and electronic circuitry, and inherently digital (and linearized) output. With no electrostatic forces applied to the pendulum during the position pickoff phase, or after the application of the restorative force, pickoff-induced errors are minimized. With little or no restorative force applied if none is required (zero acceleration), servo "spring effects" can be nearly eliminated for zero acceleration conditions. The mechanism of the servo control system is relatively simple, requiring only voltage references and switching controls. The time period for the duration of the torquing phase can also be precisely generated, and it is easily and precisely measured or directly read by a microprocessor for creating an accurate acceleration-indicative instrument output signal.

These and other advantages will be more fully understood from the detailed description that follows.

DETAILED DESCRIPTION OF THE INVENTION

Figure 1:
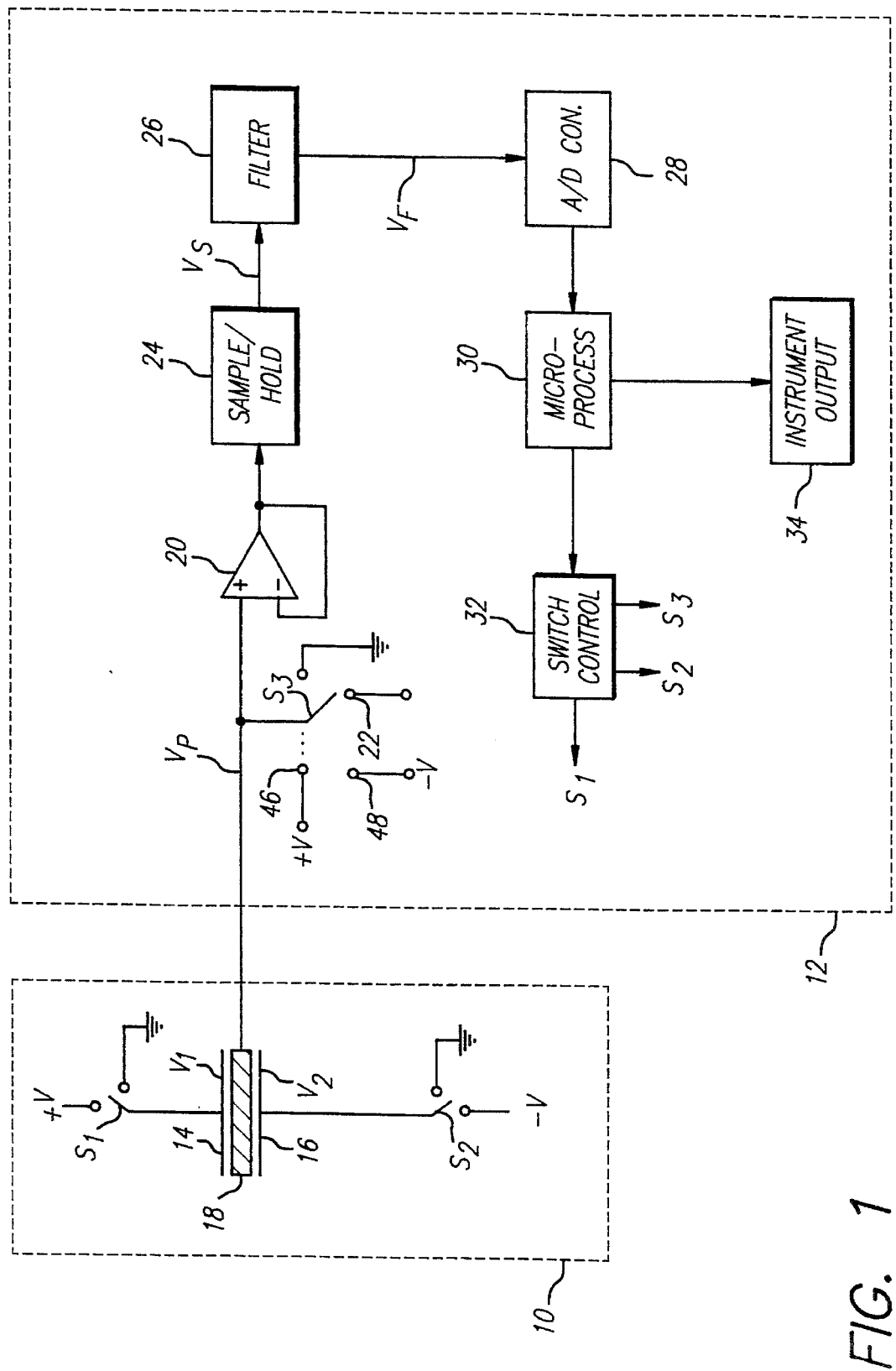
FIG. 1 is a schematic diagram of an accelerometer system in accordance with a preferred embodiment of the present invention.

Referring first to FIG. 1, an accelerometer system in accordance with a preferred embodiment of the present invention comprises an accelerometric sensor 10 and a control system 12.

The sensor 10 is advantageously of the type disclosed and claimed in the aforementioned U.S. Pat. No. 4,679,434—Stewart (commonly assigned with the rights to the present invention), the disclosure of which is expressly incorporated herein by reference. Briefly described, the sensor 10 comprises a first electrostatic plate 14 and a second electrostatic plate 16, separated by a fixed gap. A conductive sensor mass or pendulum 18 is mounted on hinges (not shown in FIG. 1) for pivotal movement within the gap between the plates 14, 16. The first plate 14 is selectively switched between a fixed positive voltage +V and ground by a first switch $S_1$. The second plate 16 is selectively switched between a negative fixed voltage −V and ground by a second switch $S_2$. Preferably, the voltages +V and −V are of equal magnitude.

Referring to the control system 12, the pendulum 18 is electrically connected to the high impedance positive input of a buffer amplifier 20, preferably configured for unity gain, as shown, wherein the output of the buffer amplifier 20 is shorted to its negative input. (The amplifier 20 may also be configured for a nonunity gain, if desired). Thus, the output voltage of the buffer amplifier 20 is proportional to the voltage or electrostatic potential experienced by the pendulum 18, which may be termed the pickoff output voltage $V_p$.

The pendulum 18 is also electrically connected to the fixed contact of a third switch $S_3$, which selectively switches the pendulum 18 between ground and an open circuit contact 22. (Two additional contacts, labelled +V and −V, may optionally be provided; their function will be described below in connection with the description of a modified control system.)

The pickoff output signal $V_p$ is inputted into the buffer amplifier 20, the output of which is fed into a sample-and-hold circuit 24, of a type well-known in the art. The output signal $V_s$ of the sample-and-hold circuit 24 is fed into a filtering circuit 26, which is a servo compensation circuit that includes proportional and integral control and high frequency roll-off. (This type of circuit is well-known in the art.) The filtered $V_s$ signal (which may be termed the force-indicative signal $V_F$) is then digitized by a conventional analog-to-digital converter circuit 28 for inputting into a microprocessor 30. The microprocessor 30 generates control signals to a switch control circuit 32, which actuates the switches $S_1$, $S_2$, and $S_3$, in the manner described below. The microprocessor 30 also provides an acceleration-indicative output signal to an instrument output device 34, which may be a visual display or a data telemetry device, for example.

Figure 2:
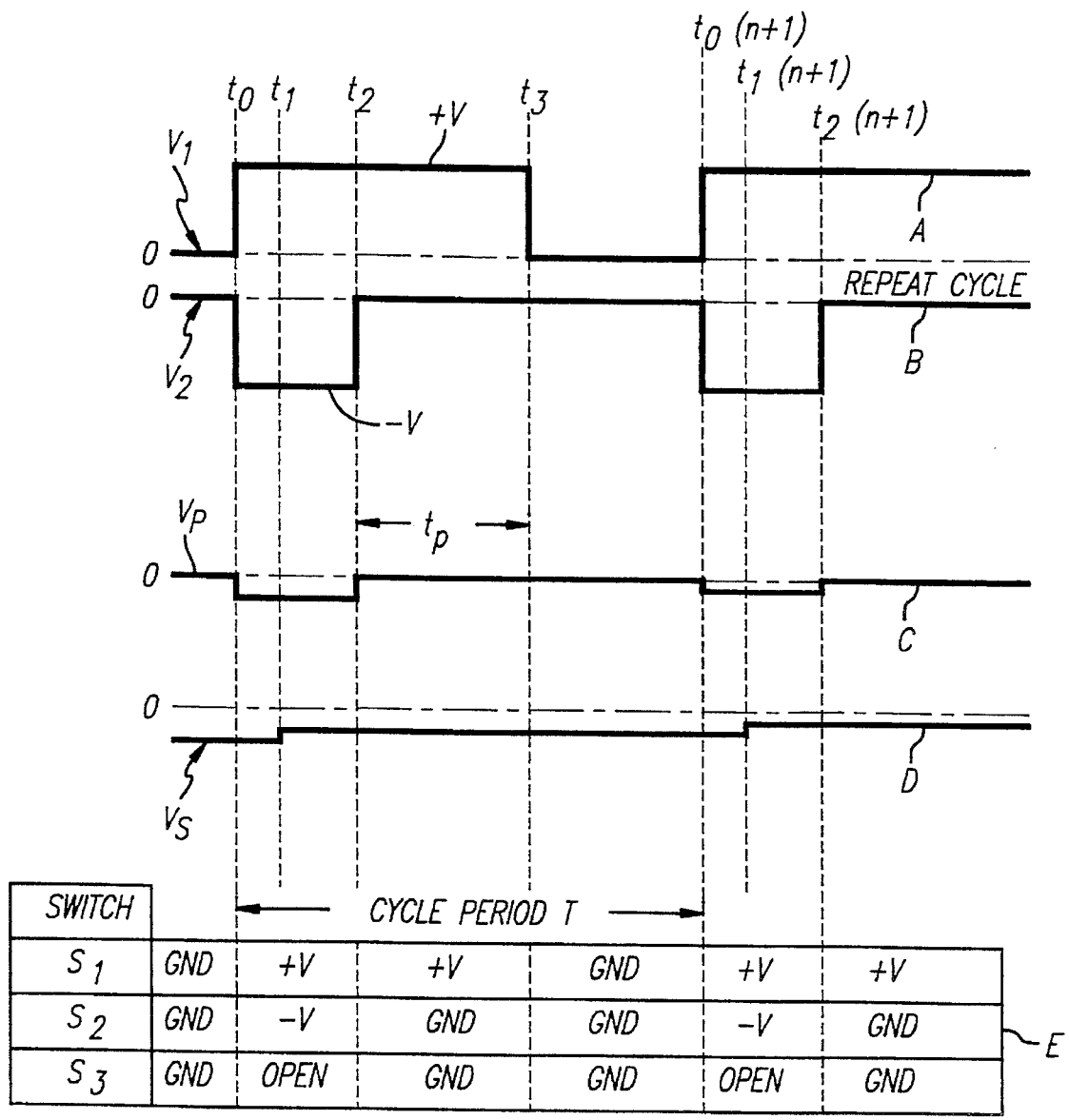
FIG. 2 is a timing diagram for the operation of the system of FIG. 1.

FIG. 2 illustrates one preferred method of operation of the system of FIG. 1. The system operates over a repeating cycle period T, generated by a clock in the microprocessor 30. A suitable cycle period T, for example, may be 200 μsec. In each cycle period T, the system operates in three phases: the pickoff phase, the torquing phase, and the quiescent phase. The values of the various voltages generated in the system over the cycle period T, as a function of time, are graphically represented in FIG. 2. Specifically, graph A represents the voltage $V_1$ on the first plate 14; graph B represents the voltage $V_2$ on the second plate 16; graph C represents the voltage $V_P$ experienced by the pendulum 18; and graph D represents the sample-and-hold circuit output voltage $V_s$. Table E illustrates the states of the switches $S_1$, $S_2$, and $S_3$ during the cycle period T.

The pickoff phase begins at time $t_0$. At this time, the voltage $V_1$ on the first plate 14 is switched by the first switch $S_1$ from ground to the fixed positive voltage +V, and the voltage $V_2$ on the second plate 16 is switched by the second switch $S_2$ from ground to the fixed negative voltage −V. This generates an electric field in the gap between the two plates, thereby establishing a voltage gradient across the pendulum 18. The pendulum 18 is switched by the third switch $S_3$ to the open circuit switch contact 22, thereby connecting the pendulum 18 directly to the high impedance positive input of the buffer amplifier 20. The high impedance of the buffer amplifier positive input effectively isolates the pendulum 18 in the electric field established between the first plate 14 and the second plate 16, so that the pendulum 18 assumes a potential or voltage $V_p$ having a magnitude and sign that depend solely on its position within the electric field established within the gap between the two plates 14, 16.

In an ideal circuit, the third switch $S_3$ would be switched to the open circuit contact 22 at the same time ($t_0$) that the first switch $S_1$ and the second switch $S_2$ switch the first and second plates to their respective fixed voltages. In practice, however, it is typically necessary to switch the third switch $S_3$ to the open circuit contact 22 slightly before $t_0$ (about 2 to 4 μsec.), in order to avoid or minimize temperature-sensitive errors induced by non-ideal switch times in the switches. This short, error-compensating lead time in the actuation of the third switch $S_3$ is not shown in the Figures.

The pendulum 18 has a null position, which may be defined as a position that is equidistant between the two plates 14, 16. This null position is assumed at a sensed acceleration input of zero. The pendulum 18 is displaced from the null position, in response to a non-zero sensed acceleration, by a distance that is proportional to the magnitude of the sensed acceleration input, and in a direction (toward one or the other of the plates) that depends upon the direction of the sensed acceleration input. Thus, the voltage $V_p$ experienced by the pendulum 18 is a direct function of the magnitude and direction of the sensed acceleration input. It is significant that, during this pickoff phase, the pendulum experiences inertial forces only; ideally, there is no net electrostatic force applied to it.

Thus, at time $t_0$, a pickoff output signal $V_p$ starts being generated (graph C). After a short delay, at time $t_1$, the sample-and-hold circuit 24 begins to output a sample-and-hold signal $V_s$ (graph D). For a total cycle period of 200 μsec, the pickoff phase ($t_0$ to $t_2$) may advantageously be about 40 μsec. At time $t_2$, the pickoff phase ends and the torquing phase begins. At this point, the magnitude and sign of the pickoff output signal are determined. In the example shown in FIG. 2, the pickoff output signal has a negative value, indicating that a positive sensed acceleration input has displaced the pendulum 18 toward the second plate 16. Thus, a restorative electrostatic force must be applied to the pendulum 18 to force it back, in a direction toward the first plate 14, to its null position. The magnitude and direction of this restorative force is indicated by the value of the force-indicative signal $V_F$ at the time $t_2$.

At the beginning of the torquing phase (time $t_2$), one of the two plates 14, 16 is switched (by its associated switch) to ground, leaving the plate needed to apply the restorative force at the voltage applied during the pickoff phase. The decision on which plate to switch to ground is made on the basis of the sign of $V_F$, as mentioned above, which is applied to the microprocessor 30 after digital conversion by the A/D converter 28. The microprocessor 30, in turn, signals the switch control circuitry 32 to actuate the switches appropriately. In the example shown in FIG. 2, the second plate 16 is switched to ground by the second switch $S_2$, while the first plate 14 is maintained at the voltage $V_1$. The third switch $S_3$ is switched to ground, thereby grounding the pendulum 18, and allowing it to experience the electrostatic restorative force applied by the still-energized first plate 14.

The torquing phase continues, with the above-noted switch settings, for a period of time $t_p$ indicated by the magnitude of the force-indicative signal $V_F$. This time period $t_p$ extends from the time $t_2$ to a time $t_3$, at which latter time the torquing phase ends and the quiescent phase begins. The duration $t_p$ of the torquing phase is the time during which the restorative electrostatic force is applied to the pendulum 18, and it will vary in proportion to the magnitude of the inertial force due to the sensed acceleration, as indicated by the magnitude of the force-indicative signal $V_F$. Because the mass of the pendulum 18 is a known constant, the duration $t_p$ of the torquing phase is a measure of the sensed acceleration input.

At time $t_3$, the quiescent phase begins. At this point, the previously energized plate (the first plate 14, in the example of FIG. 2) is switched to ground, and no electrostatic forces are applied to the pendulum 18 for the remainder of the cycle period T. After the end of the cycle period T, a new cycle period begins with a repeat of the pickoff phase at a time $t_{0(n+1)}$ (where n is an integer equal to or greater than zero). A new pickoff output signal is obtained, based on the new position of the pendulum 18, and a new force-indicative signal $V_F$ is generated that is applied to generate an electrostatic restorative force over a new torquing phase duration $t_p$. It is seen that, with each successive cycle period, the pendulum 18 is positioned closer to its null position, as indicated by the incremental decrease in the magnitudes of the pickoff output signal $V_P$ and the sample-and-hold signal $V_s$ in each successive cycle period.

After digitizing by the A/D converter 28, the force-indicative signal $V_F$ is, as mentioned above, inputted into the microprocessor 30, which calculates the torquing phase duration $t_p$ and determines which plate to switch to ground. The switch control circuit 32 then actuates the appropriate switches in accordance with instructions contained in the output signal from the microprocessor 30. The microprocessor 30 includes an internal clock (not shown), which may have a clock rate, for example, of about 2.5 MHz (400 nsec). The times $t_0$ and $t_2$ are set internally, while the time $t_3$ depends on the magnitude of the force-indicative signal $V_F$. Each of the switch actuation times $t_0$, $t_2$, and $t_3$ can only occur at a clock pulse edge.

During each cycle period, the value of the torquing phase duration $t_p$ is stored in memory in the microprocessor 30, while the number of elapsed cycle periods is counted and stored. To obtain an acceleration-indicative instrument output signal, the microprocessor 30 periodically addresses the memory to obtain the accumulated value of the torquing phase durations, which the microprocessor 30 then divides by the total elapsed time since the last reading (the product of the length of the cycle period T and the number of cycle periods counted). This yields a value for the average acceleration since the last reading. This value is represented by an acceleration-indicative output signal, which is directed to the instrument output device 34.

Specifically, during each cycle period T, the torquing phase duration $t_p$ represents a change in velocity for that cycle period. When the torquing phase duration is divided by the length of the cycle period ($t_p/T$), the result is the change in velocity per second, i.e., acceleration. Thus, for example, if the memory is addressed to perform the above-mentioned calculation every ten cycle periods (i.e., a sampling rate of 10 T), the sum of the previous ten values of the torquing phase duration $t_p$ is divided by ten times the cycle period, with the result being the average acceleration over the previous ten cycle periods. Alternatively, an acceleration-indicative instrument output signal can be obtained for each cycle period by having the microprocessor divide the torquing phase duration $t_p$ in each cycle period by the length of the cycle period T. Both the length of the cycle period T and the sampling rate can be selected to suit the bandwidth and resolution requirements of each particular application.

Figure 3A:
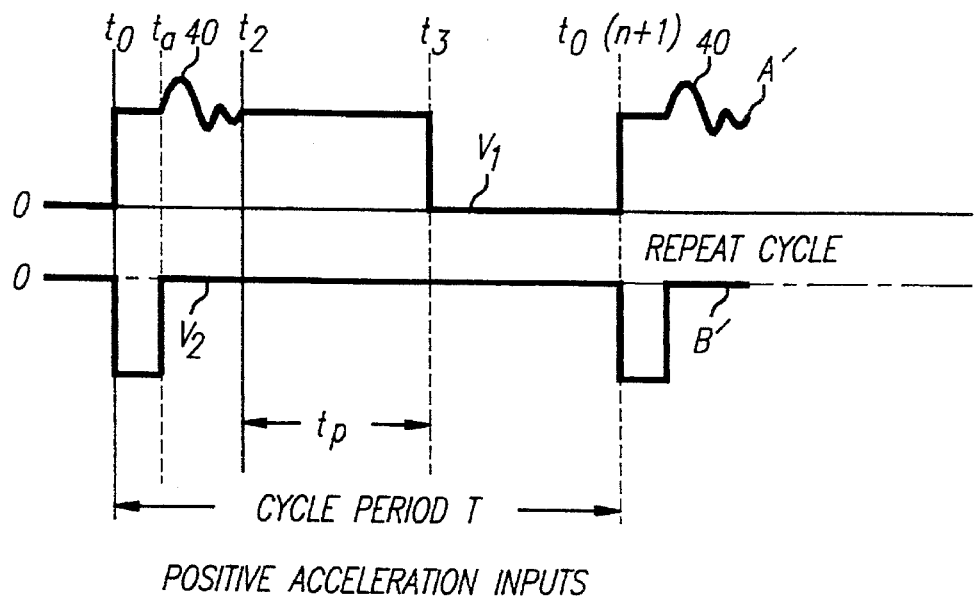
FIG. 3A is a timing diagram showing the voltage of the electrode plates in a modification of the system of FIG. 1 as a function of the cycle time T, for positive acceleration inputs.
Figure 3B:
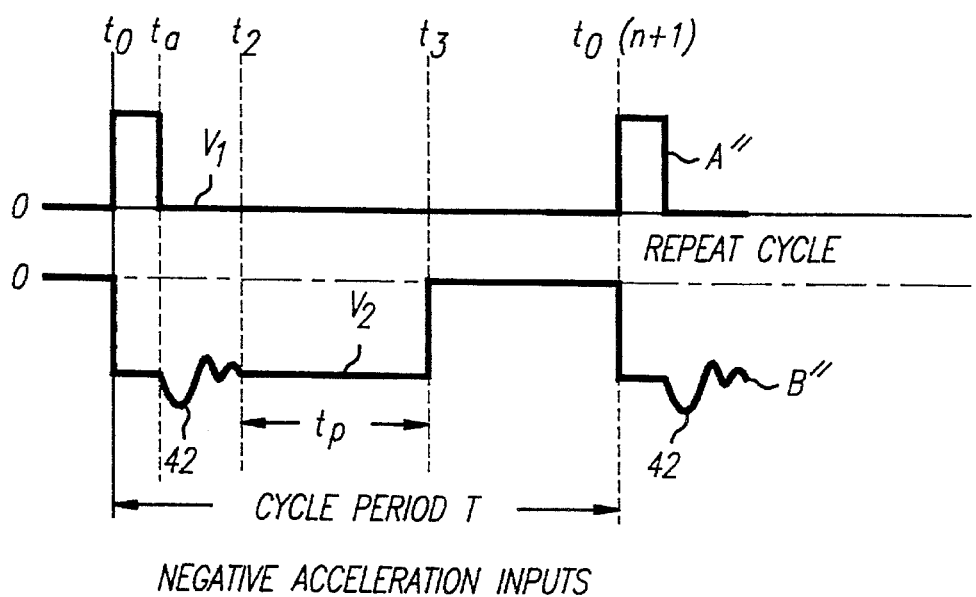
FIG. 3B is a timing diagram showing the voltage of the electrode plates in a modification of the system of FIG. 1 as a function of the cycle time T, for negative acceleration inputs.

FIGS. 3A and 3B illustrate a modified method of operation for the system of FIG. 1. This method minimizes or substantially eliminates errors associated with the transient electrostatic forcing that occurs at the points during the cycle period T at which switching occurs. The main difference between this method and that illustrated in FIG. 2, is that the plate that is not selected to apply the electrostatic restorative force is grounded, along with the pendulum 18, at a time $t_a$ that occurs before the torquing phase begins at the time $t_2$. In other words, there is a short delay between the end of the pickoff phase at time $t_a$ and the beginning of the torquing phase at time $t_2$. This short delay allows for the voltage transient to die out before the torquing phase duration $t_p$ is measured. The force acting on the pendulum 18 during the transient period (from $t_a$ to $t_2$) is treated by the microprocessor 30 as a bias for the energized plate, and may be compensated for during a calibration procedure.

FIG. 3A represents the voltages on the electrode plates as a function of time for positive acceleration inputs. The upper graph A' represents the voltage $V_1$ on the first (positive potential) plate 14, while the lower graph B' represents the voltage $V_2$ on the second (negative potential) plate 16. The pickoff phase begins at time $t_0$, with both plates 14, 16 energized and the pendulum switch $S_3$ open-circuited, thereby connecting the pendulum 18 to the high impedance positive input of the buffer amplifier 20 (FIG. 1). At time $t_a$, the second plate 16 and the pendulum 18 are grounded, as described above, and the first plate 14 experiences a voltage transient 40, which rapidly decays in amplitude to substantially zero at the commencement of the torquing phase at time $t_2$. As previously described, the torquing phase ends and the quiescent phase begins at time $t_3$, torquing phase duration $t_p$ being measured, as before, between $t_2$ and $t_3$.

FIG. 3B illustrates the plate voltages as a function of time for negative acceleration inputs. The upper graph A" represents the voltage $V_I$ on the first plate 14, and the lower graph represents the voltage $V_2$ on the second plate 16. As in FIG. 3A, the pickoff phase begins at time $t_0$ and ends at time $t_a$. In this case, however, it is the first (positive potential) plate 14 that is grounded (along with the pendulum 18) at $t_a$, resulting in a voltage transient 42 for the second (negative potential) plate 16, which decays substantially to zero at the commencement of the torquing phase at time $t_2$.

The system of FIG. 1 may be further modified to be operated by an alternative method that provides four times as much electrostatic torquing force on the pendulum 18 as the methods illustrated in FIGS. 2, 3A, and 3B, for a given voltage applied to the plates 14, 16. Referring again to FIG. 1, in this modification, the third switch $S_3$ for the pendulum 18 is provided with two additional contacts: a third contact 46 connected to the fixed positive voltage applied to the first plate 14, and a fourth contact 48 connected to the fixed negative voltage applied to the second plate 16.

Figure 4:
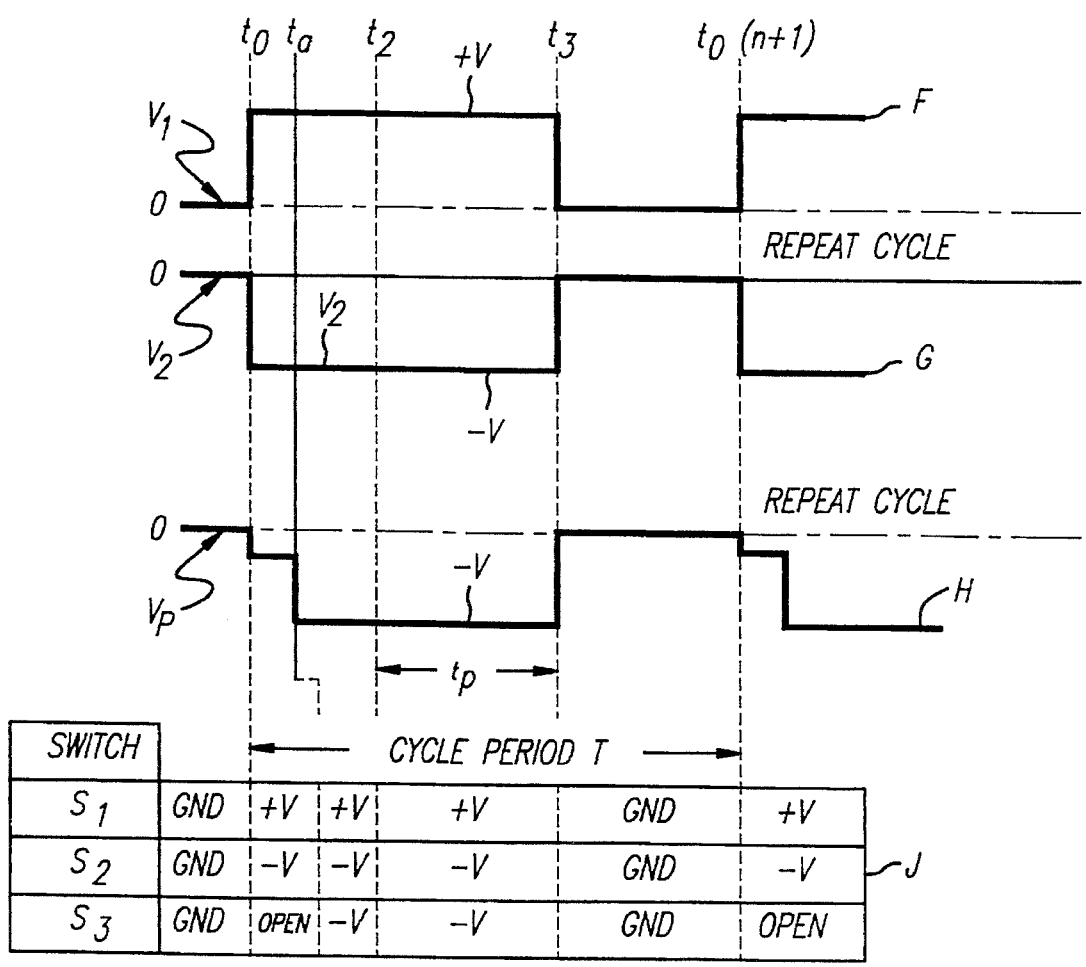
FIG. 4 is a timing diagram for an alternative mode of operation of the system of FIG. 1.

FIG. 4 illustrates the method of operation of the modified version of the system of FIG. 1. In this Figure, graph F represents the voltage $V_1$ on the first (positive potential) plate 14 as a function of time, graph G represents the voltage $V_2$ on the second (negative potential) plate 16 as a function of time, and the graph H represents the pickoff output signal $V_p$ as a function of time. The table J represents the switching states of the first switch $S_1$, the second switch $S_2$, and the third switch $S_3$ as a function of time.

The pickoff phase starts at $t_0$, with both plates energized with their respective applied voltages, and with the pendulum 18 connected to the high impedance positive input of the op amp 20 by means of the third switch $S_3$ being switched to the open circuit contact 22. The pickoff phase ends at time $t_a$. At this point, the plate that is not needed to apply the restorative force on the pendulum 18 is maintained at its applied voltage, and the switch $S_3$ is switched to connect the pendulum 18 to the voltage applied to that plate. In the example shown in FIG. 4 (which illustrates the response to positive acceleration inputs), the second plate 16 is not needed to apply the restorative force. It is maintained at its applied negative potential $V_2$, and the pendulum 18 is likewise switched to this negative potential by switching the third switch $S_3$ to the negative voltage contact 48. As a result, the electric field between the pendulum 18 and the plate to which it is effectively shorted (the second plate 16, in this example) vanishes, but the field strength between the pendulum 18 and the restorative force-applying plate (the first plate 14, in this example) is doubled. Since the restorative torquing force applied to the pendulum 18 is proportional to the square of the electric field strength, a doubling of the field strength results in a quadrupling of the electrostatic torquing force applied to the pendulum to restore the pendulum to its null position.

After a short delay to allow for the decay of voltage transients (as in the method described above with respect to FIGS. 3A and 3B), the torquing phase begins at time $t_2$ and ends at time $t_3$, thereby defining the torquing phase duration $t_p$. At the time $t_3$, the electrode plates 14, 16 and the pendulum 18 are all switched to ground by appropriate actuation of the switches $S_1$, $S_2$, and $S_3$, respectively, as in the previously-described methods, to begin the quiescent phase.

In response to a negative acceleration input, the first (positive potential) plate 14 would remain energized at its positive potential $V_1$ at time $t_a$, and the pendulum 18 would be connected to this positive potential by switching the third switch $S_3$ to the positive voltage contact 46. In all other respects, the operation would proceed as described above for a positive acceleration input.

The above described system lends itself to still another modification, in which different voltage levels are applied to the electrode plates 14, 16 to accommodate measurements in different acceleration ranges. For example, the voltages $V_1$ and $V_2$ applied to the first plate 14 and the second plate 16, respectively, can be provided by switching among a plurality of preselected fixed voltages. Specifically, a lower voltage can be selected for acceleration measurements in the normally anticipated range. The system would then switch to a higher voltage in response to a combined pickoff phase duration and torquing phase duration that exceeds a preselected maximum percentage of the cycle period T (indicating a sensed acceleration greater than the normally anticipated range), and then switch back to the lower voltage when the combined pickoff phase duration and torquing phase duration falls below a preselected minimum percentage of the cycle period T (indicating that the sensed acceleration is within the normally anticipated range.)

Thus, two or more modes, each corresponding to a preselected acceleration range, could be accommodated, with the addition only of switchable voltage sources. The microprocessor 30 could control the switching among the voltage levels, and the software could also accommodate changes in any bias and torquing scale factors that would result from the mode changes. Furthermore, the software could be used to adjust any servo gain that occurs in the different modes. As another variation, the switchable voltage source for each electrode plate could be derived from a single main voltage source that is connected to a resistive ladder network to ground. The various selected voltage levels would then be tapped from the ladder network, with the voltage levels being determined by the resistor values.

From the foregoing description, it can be appreciated that the present invention, by applying fixed voltage pulses to the plates only as needed during the pickoff and torquing phases ("pulse-on-demand"), and by applying (ideally) no net electro-static forces to the sensing mass (the pendulum 18) during the pickoff phase, minimizes or eliminates, as sources of error, negative spring effects and forces on the sensing mass during the position detection (pickoff) phase. Moreover, this characteristic of the present invention also optimizes null stability and repeatability, while minimizing effects that can produce spurious output signals. Furthermore, these advantageous operating characteristics are achieved using circuitry that is relatively simple and inexpensive, using off-the-shelf components.

While a preferred embodiment of the invention has been described herein, along with several variations in the method of operation of the invention, it will be appreciated that further variations and modifications in both the method and apparatus of the present invention will suggest themselves to those skilled in the pertinent arts. Such variations and modifications should be considered within the spirit and scope of the present invention, as defined in the claims that follow.

What is claimed is:

1. An accelerometer system, comprising:

first and second conductive plates in a fixed spatial relationship;

a first switch for selectively connecting the first plate to a fixed positive potential and to ground;

a second switch for selectively connecting the second plate to a fixed negative potential and to ground;

a conductive pendulum resiliently suspended between the first and second plates and responsive to sensed inertial acceleration inputs by moving toward one or the other of the first and second plates from a predetermined null position;

a third switch for selectively connecting the pendulum to a high impedance and to at least one predetermined fixed potential, including ground, to which each of the first and second plates can be connected;

a microprocessor, responsive to a force-indicative signal, and having a clock that establishes a cycle period, and producing (a) a first control signal indicative of first, second, and third time intervals within the cycle period; and (b) a second control signal;

switch control means, responsive to the first and second control signals, for (a) actuating the first switch to connect the first plate to the fixed positive potential and actuating the second switch to connect the second plate to the fixed negative potential at the beginning of the first time interval, and actuating the third switch to connect the pendulum to the high impedance at or shortly before the beginning of the first time interval; (b) actuating the third switch and a selected one of the first and second switches to connect the pendulum and a selected one of the plates, selected in response to the second control signal, to one predetermined fixed potential, no later than the beginning of the second time interval; (c) actuating the previously unselected one of the first and second switches to connect the previously unselected plate to ground at the beginning of the third time interval; and (d) if the one predetermined fixed potential is other than ground, actuating the third switch to connect the pendulum to ground at the beginning of the third time interval; and signal generating means, electrically coupled to the pendulum and responsive to the voltage on the pendulum during the first time interval, when the first plate is connected to the fixed positive potential, the second plate is connected to the fixed negative potential, and the pendulum is connected to the high impedance, wherein the pendulum voltage is indicative of the acceleration-responsive displacement of the pendulum from the null position, the signal generating means producing the force-indicative signal indicative of the force required to restore the pendulum to the null position;

wherein the microprocessor is responsive to the force-indicative signal by (a) generating the second control signal in response to the sign of the force-indicative signal, and (b) varying the length of the second time interval in proportion to the magnitude of the force-indicative signal, whereby the length of the second time interval is indicative of the sensed acceleration input.

2. The system of claim 1, wherein the first switch is for selectively connecting the first plate to any of a selected plurality of fixed positive potentials and to ground, and wherein the second switch is for selectively connecting the second plate to any of a selected plurality of fixed negative potentials and to ground.

3. The system of claim 1, wherein the one predetermined fixed potential is ground, and wherein the switch control means actuates the third switch and the selected one of the first and second switches to connect the pendulum and the selected one of the plates to ground no later than the beginning of the second time interval.

4. The system of claim 1, wherein the third switch is for selectively connecting the pendulum to a high impedance, to the fixed positive potential, to the fixed negative potential, or to ground; wherein the switch control means actuates the third switch to connect the pendulum to the fixed potential of the selected plate no later than the beginning of the second time interval; and wherein the switch control means actuates the first, second, and third switches to connect the pendulum, the first plate, and the second plate to ground at the beginning of the third time interval.

5. The system of claim 1, wherein the signal generating means comprises:

a buffer amplifier having a high impedance input and an amplifier output, the pendulum being electrically coupled to the high impedance input;

a sample-and-hold circuit having a sample-and-hold input and a sample-and-hold output, the amplifier output being electrically coupled to the sample-and-hold input;

a servo compensation circuit including proportional and integral control, and having a servo circuit input and a servo circuit output, the sample-and-hold output being electrically coupled to the servo circuit input; and an analog-to-digital converter, having an analog input that is electrically coupled to the servo circuit output, and a digital output that is electrically coupled to an input of the microprocessor.

6. For use with a force balanced instrument comprising a sensing mass that is displaced from a null position in response to a sensed inertial acceleration input to be measured, and first and second electrostatic plates mounted adjacent to and on opposite sides of the sensing mass, a method of measuring acceleration, comprising the cyclical repetition of the steps of:

(a) determining a fixed time period;

(b) during a first predetermined interval within the time period, applying equal and opposite fixed potentials to the first and second plates, respectively, while the sensing mass is electrically isolated so as to assume a pickoff voltage that is indicative of its displacement from the null position;

(c) applying the pickoff voltage to generate a force-indicative signal that indicates the magnitude and direction of the force needed to restore the sensing mass to the null position;

(d) selecting one of the plates for the application of a restorative electrostatic force to the sensing mass, based upon the sign of the force-indicative signal; and (e) after the end of the first interval, applying a fixed potential to the selected plate for a second time interval within the fixed time period, the second interval having a duration that is proportional to the magnitude of the force-indicative signal, wherein the ratio of the duration of the second time interval to the fixed time period is a measure of the sensed inertial acceleration during the fixed time period.

7. The method of claim 6, wherein the step of applying the fixed potential to the selected plate includes the step of:

(e)(1) applying to the sensing mass and to the plate not selected in the selecting step an electric potential that allows the selected plate to apply an electrostatic force to the sensing mass that tends to restore the sensing mass to the null position.

8. The method of claim 7, further comprising the step of:

(f) grounding the sensing mass and both plates from the end of the second time interval until the end of the fixed time period.

9. The method of claim 7, wherein the electric potential that allows the selected plate to apply an electrostatic force to the sensing mass is ground potential.

10. The method of claim 7, wherein the electric potential that allows the selected plate to apply an electrostatic force to the sensing mass is the fixed potential applied, during the first time interval, to the plate not selected in the selecting step.

11. The method of claim 6, further comprising the steps of:

(f) for each fixed time period, calculating the ratio of the duration of the second time interval to the fixed time period; and (g) generating an output signal indicative of the ratio.

12. The method of claim 6, the further comprising the steps of:

(f) accumulating the total value of the second time interval durations for a predetermined number of fixed time periods;

(g) after the predetermined number of time periods have passed, calculating the total elapsed time in the predetermined number of fixed time periods, and calculating the ratio of the total value of the second time interval durations to the total elapsed time; and (h) generating an output signal indicative of the ratio.

13. The method of claim 6, further comprising the step of:

(f) grounding the sensing mass and both plates from the end of the second time interval until the end of the fixed time period.

14. In a force balanced instrument, of the type including a sensing mass that is displaced from a null position in response to a sensed inertial acceleration input to be measured, and first and second electrostatic plates mounted adjacent to and on opposite sides of the sensing mass, the improvement comprising:

first means for generating a clock signal representing a fixed time period;

second means for applying a fixed positive voltage to the first plate and a fixed negative voltage to the second plate during a first time interval within the fixed time period;

third means for generating a pickoff signal indicative of the magnitude and direction of the displacement of the sensing mass in response to a sensed acceleration input during the first time interval;

fourth means, responsive to the pickoff signal, for generating a force-indicative signal indicative of the magnitude of an electrostatic restorative force required to restore the sensing mass to the null position;

fifth means, responsive to the force-indicative signal, for (a) supplying a selected one of the first and second plates with a first fixed potential that applies the restorative force to the sensing mass, the restorative force being applied for a second time interval within the fixed time period, the duration of the second time interval being proportional to the magnitude of the force-indicative signal; and (b) electrically coupling the sensing mass and the unselected one of the first and second plates to a second fixed potential; and sixth means, responsive to the clock signal, for generating an output signal indicative of the ratio of the duration of the second time interval to the fixed time period, which ratio is a measure of the sensed acceleration input.

15. The improvement of claim 14, wherein the second means creates a static electric field between the first and second plates, and wherein the third means includes means for electrically isolating the sensing mass in the field, so that the sensing mass is subject to no substantial electrostatic force during the first time interval.

16. The improvement of claim 14, wherein the force indicative signal has a sign indicative of the direction of the restorative force to be applied to the sensing mass, and wherein the fifth means selects the selected plate in response to the sign of the force-indicative signal.

17. The improvement of claim 15, wherein the third means comprises switching means for selectively connecting the sensing mass to a high impedance and to ground, and wherein the switching means is actuated to connect the sensing mass to the high impedance during the first time interval, and to ground during the second time interval.

18. The improvement of claim 15, wherein the third means comprises switching means for selectively connecting the sensing mass to a high impedance, to the fixed positive voltage, or to the fixed negative voltage, and wherein the switching means is actuated to connect the sensing mass to the high impedance during the first time interval, and to either the fixed positive voltage or the fixed negative voltage, in response to the sign of the force-indicative signal, during the second time interval.

19. The improvement of claim 14, further comprising seventh means for grounding the first and second plates and the sensing mass from the end of the second time interval to the end of the fixed time period.

20. The improvement of claim 14, wherein the second fixed potential is ground.

* * * * *